United States Patent [19]

Harada et al.

[11] Patent Number: 5,123,234
[45] Date of Patent: Jun. 23, 1992

[54] WORKING VEHICLE HAVING A MOWER UNIT VERTICALLY MOVABLE RELATIVE TO A VEHICLE BODY

[75] Inventors: Eriya Harada; Yoji Fujiwara, both of Osaka, Japan

[73] Assignee: Kubota Corporation, Osaka, Japan

[21] Appl. No.: 679,364

[22] Filed: Apr. 2, 1991

[30] Foreign Application Priority Data

| Oct. 2, 1990 | [JP] | Japan | 2-265897 |
| Oct. 6, 1990 | [JP] | Japan | 2-269091 |
| Nov. 5, 1990 | [JP] | Japan | 2-300319 |

[51] Int. Cl.$^5$ ............................................. A01D 67/00
[52] U.S. Cl. ......................................................... 56/10.2
[58] Field of Search ................ 56/10.2, 10.4, 10.5, 56/10.8, 16.7, 17.1

[56] References Cited

U.S. PATENT DOCUMENTS

| 3,985,196 | 10/1976 | Deschamps | 56/10.2 X |
| 4,204,383 | 5/1980 | Milliken, Jr. | 56/10.2 |
| 4,567,719 | 2/1986 | Soots et al. | 56/10.2 X |
| 4,573,124 | 2/1986 | Seiferling | 56/10.2 X |

*Primary Examiner*—Thuy M. Bui
*Attorney, Agent, or Firm*—Jordan and Hamburg

[57] ABSTRACT

A working vehicle has a grass cutting unit vertically movable relative to a vehicle body, a lift mechanism for raising and lowering the grass cutting unit, a clutch for making and breaking transmission of blade driving power to the grass cutting unit, and a device for controlling the lift mechanism. The control device controls the lift mechanism to lower the grass cutting unit when the clutch is operated to transmit power to the grass cutting unit, and to raise the grass cutting unit when the clutch is operated to break power tranmission to the grass cutting unit. According to this construction, only a device for actuating the clutch may be operated to switch between an operative condition in which the grass cutting unit is lowered and its cutting blades driven, and an inoperative condition in which the grass cutting unit is raised with the cutting blades stopped. Alternatively, the control device may control the clutch through a device for actuating the lift mechanism. In this case, only the device for actuating the lift mechanism may be operated to switch between the operative condition in which the grass cutting unit is lowered and its cutting blades driven, and the inoperative condition in which the grass cutting unit is raised with the cutting blades stopped.

8 Claims, 7 Drawing Sheets

WORKING VEHICLE HAVING A MOWER UNIT VERTICALLY MOVABLE RELATIVE TO A VEHICLE BODY

BACKGROUND OF THE INVENTION

1. Field of the Invention

The present invention relates to a working vehicle having a grass cutting unit vertically movable relative to a vehicle body, and particularly to a raising and lowering control of the grass cutting unit.

2. Description of the Prior Art

Conventionally, a lawn mower often includes a hydraulic control device for raising and lowering a grass cutting unit, and a control device for controlling a PTO clutch to make or break torque transmission to the grass cutting unit. Vertical movement of the grass cutting unit and rotation of cutting blades are controlled by manually operating the two control devices during a grass cutting operation.

When such a lawn mower is turned around at an end of a plot of ground on which a grass cutting operation is carried out, the controls for vertically moving the grass cutting unit and operating the PTO clutch are carried out along the maneuvering of the lawn mower. Considerable skill is required to effect such controls smoothly and promptly. An error in the control sequence tends to result in uncut patches or an unsatisfactory finish.

To solve this problem, the PTO clutch may be linked with a control valve of a hydraulic cylinder from vertically moving the grass cutting unit, to improve efficiency of the grass cutting operation by operating a single control device to effect both vertical movement of the grass cutting unit and operation of the PTO clutch. However, a great operating force is required where an interlock is made between push-pull movement of the control valve and a movement transmission member such as rods or wiring for operation the PTO clutch. Moreover, means is required for absorbing and adjusting a difference in mechanical stroke between the two control systems, which tends to complicate the construction. The control valve may be of the electromagnetic type, but this in practice has a disadvantage in terms of cost in that an electric control device is required in addition to an expensive hydraulic control system including pumps, control valves, piping and hydraulic cylinders.

Further, the grass cutting unit usually is designed to be lowered to variable positions to adjust cutting height in an operative condition. The grass cutting unit is movable to a fixed upward position for an inoperative or contained condition. It has been found that this aspect produces certain inconveniences depending on the particular use of the lawn mower. The grass cutting unit is raised to a high upward position during a run on a road, to avoid contact with road surfaces. However, when running on a sloped terrain such as on a golf course, the lawn mower has an elevated center of gravity because the grass cutting unit is raised to the high position. Consequently, the lawn mower must run in an unstable state compared to running during grass cutting operation.

SUMMARY OF THE INVENTION

An object of the present invention is to provide a working vehicle capable of effecting controls for raising and lowering a grass cutting unit and driving cutting blades in an optimal way in accordance with working conditions. Such controls must be implemented at a relatively low cost.

The above object is fulfilled, according to the present invention, by a working vehicle comprising a grass cutting unit vertically movable relative to a vehicle body, a lift mechanism for raising and lowering the grass cutting unit, a clutch for making and breaking transmission of blade driving power to the grass cutting unit, and a device for controlling the lift mechanism. The control device controls the lift mechanism to lower the grass cutting unit when the clutch is operated to transmit power to the grass cutting unit, and to raise the grass cutting unit when the clutch is operated to break power transmission to the grass cutting unit. According to this construction, only a device for actuating the clutch may be operated to switch between an operative condition in which the grass cutting unit is lowered and its cutting blades driven, and an inoperative condition in which the grass cutting unit is raised with the cutting blades stopped.

Alternatively, the control device may control the clutch by means of a device for actuating the lift mechanism. In this case, only the device for actuating the lift mechanism may be operated to switch between the operative condition in which the grass cutting unit is lowered and its cutting blades driven, and the inoperative condition in which the grass cutting unit is raised with the cutting blades stopped.

It is also possible to select between the above two actuating devices to act as a trigger for the control to selectively realize the two conditions.

An electric actuator may be employed as a drive source for the lift mechanism. In this case, only a light operating force is required for turning an electric switch therefor on and off, and a simple electronic control is adequate for the electric actuator and a control device for controlling the actuator. Consequently, the construction may be simpler and less expensisve than using a hydraulic control system and an electric control system.

In a preferred embodiment of the present invention, the stopping positions of the grass cutting unit are variable. According to this construction, the grass cutting unit has stopping positions variable by a varying and adjusting mechanism, both in the upper, inoperative or contained condition and in the lower, operative condition. Thus, the lower position may be varied for different terrains and, when running on a sloping ground, the upper position to which the grass cutting unit is raised may be adjusted according to the gradient. By positioning the grass cutting unit at the lowest possible level free from contact with ground surfaces, the working vehicle has a lowered center of gravity to run on a sloping terrain more stably than in the prior art.

In a further embodiment of the present invention in which the grass cutting unit is attached to the front of the working vehicle, the grass cutting unit is forcibly lowered on the basis of a detected inclination of the vehicle. According to this construction, the grass cutting unit is automatically lowered when the vehicle, with the grass cutting unit in the upper position, runs onto a sloping terrain and becomes inclined in excess of a predetermined degree. Consequently, safety is enhanced by avoiding the running instability occurring when the driver forgets to lower the grass cutting unit on a sloping, terrain, and the forward thrust occurring when the vehicle is braked suddenly. The grass cutting unit may automatically be returned to the original upper position once the vehicle becomes level. This provides the advantage of promoting operability in that, even where sloping terrains are encountered repeatedly, the grass cutting unit need not be raised and lowered by troublesome manual operations.

Other objects and features of this invention will be understood from the following description made with reference to the accompanying drawings.

DESCRIPTION OF THE PREFERRED EMBODIMENTS

Figure 1:
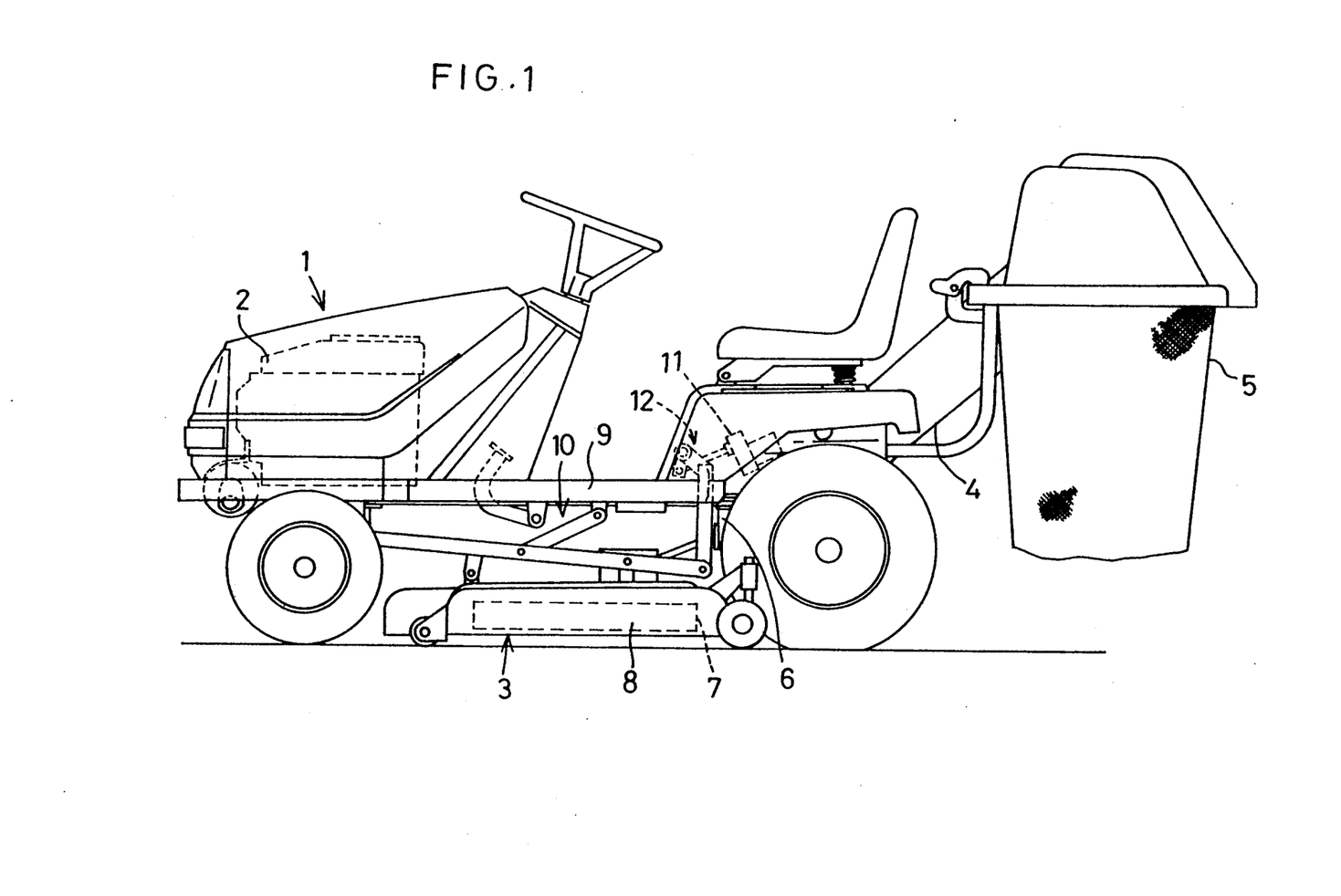
FIG. 1 is a side elevation of a lawn mower with raising and lowering control for a grass cutting unit according to the present invention.

FIG. 1 shows a riding lawn mower according to the present invention.

This lawn mower has a vehicle body 1 carrying an engine 2 on a front portion thereof, and a grass cutting unit 3 vertically movably connected to a lower position between front and rear wheels. Grass clippings cut by the grass cutting unit 3 are transported through a duct 4 to a grass catcher 5 disposed rearwardly of the vehicle body 1.

A structure for raising and lowering the grass cutting unit 3 will be described next.

The grass cutting unit 3 includes a mower deck 8 containing cutting blades 7 driven by power transmitted from the engine 2 through a transmission 6. The mower deck 8 and body frames 9 are vertically movable in horizontal posture relative to the vehicle body 1 through a parallel link mechanism 10 which is itself known and details of which are not illustrated. The grass cutting unit 3 is raised and lowered by an electric motor 11 and a lifting link mechanism 12.

Figure 2:
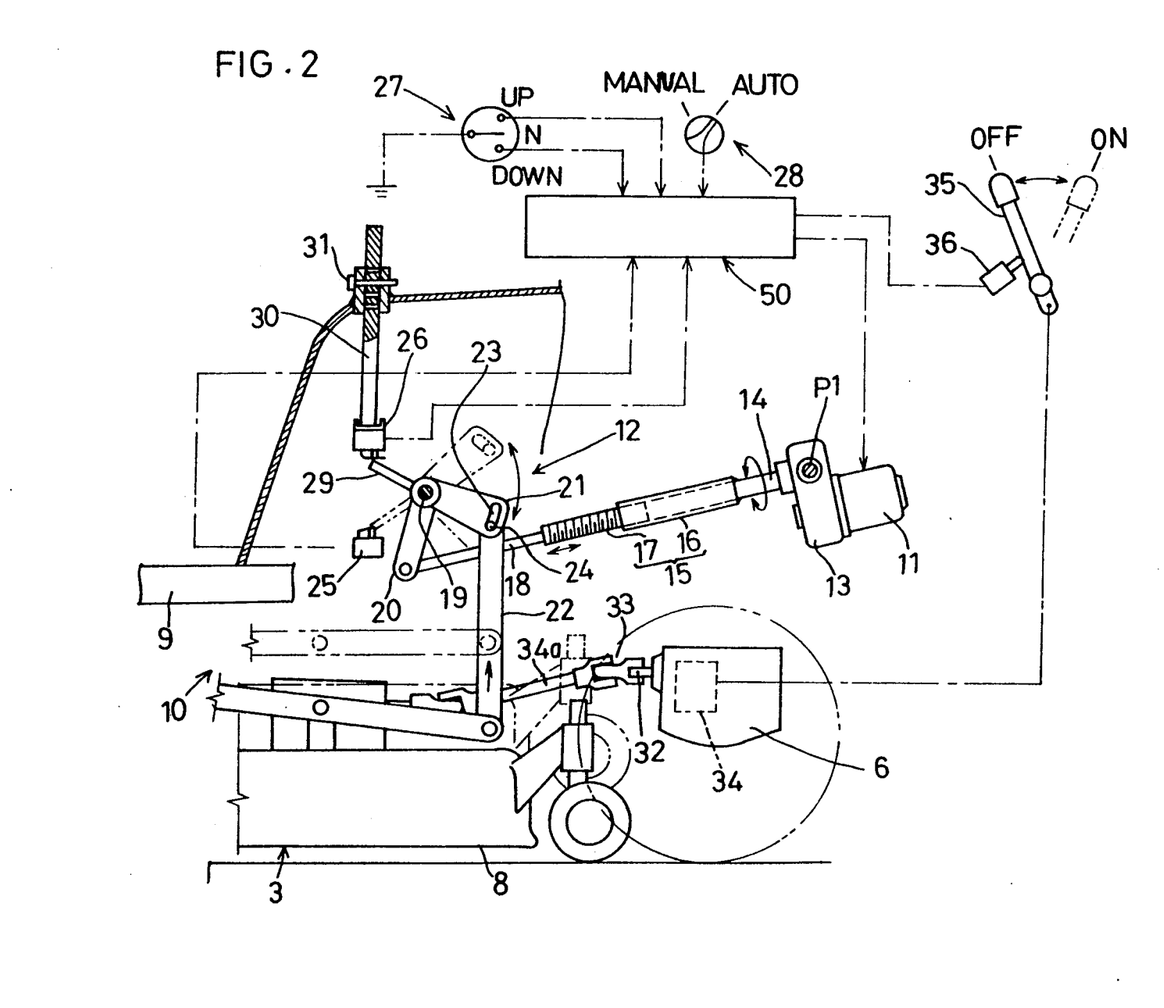
FIG. 2 is an explanatory view of a raising and lowering system for the grass cutting unit.

Specifically, as shown in FIG. 2, the electric motor 11 having a reduction mechanism 13 is supported by the vehicle body to be rotatable on a transverse axis P1, with a drive shaft 14 extending to be rotatable in opposite directions on an axis perpendicular to the transverse axis P1. The drive shaft 14 is connected to the lift mechanism 12 through a screw feed mechanism 15 and an intermediate shaft 18. The screw feed mechanism 15 includes a female screw 16 mounted on an end of the drive shaft 14 and coaxially meshed with a threaded portion 17 of the intermediate shaft 18.

The link mechanism 12 includes a rotary support shaft 19 supported by a bracket, now shown, attached to the right and left body frames 9. The rotary shaft 19 carries a drive arm 20 fixed thereto and pivotally connected to an end of the intermediate shaft 18. The rotary shaft 19 further carries a swing arm 21 fixed thereto for suspending the grass cutting unit 3. The swing arm 21 is pivotally connected to the mower deck 11 through a link 22. The swing arm 21 defines a slot 23 and the link 22 includes a pin 24, through which the arm 21 and link 22 are interconnected with play therebetween. Thus, the link mechanism 12 is constructed to raise and lower the grass cutting unit with extension and retraction of the intermediate shaft 18 caused by opposite rotations of the drive shaft 14.

A pair of limit switches 25 and 26 is provided to act as detecting means to output a detection signal when the grass cutting unit 3 moves to a predetermined position. The detection signal is applied to a control device 50 for stopping the electric motor 11. The control device 50 is connected to a manual switch 27 disposed in a driver's section for raising and lowering the grass cutting unit 3, and to a changeover switch 28 also disposed in the driver's section for setting the manual switch 27 to either manual control or automatic control.

To describe the functions of the limit switches 25 and 26, when the manual switch 27 is operated to a raising position with the changeover switch 28 set for the manual control, the electric motor 11 drives the grass cutting unit 3 upward. When the grass cutting unit 3 reaches a predetermined position, a contact piece 29 attached to the rotary shaft 19 contacts the limit switch 25 which determines an upper limit, whereby the control device 50 stops the motor 11. Similarly, when the manual switch 27 is operated to a lowering position, the contact piece 29 contacts the limit switch 26 which determines a lower limit, to stop the grass cutting unit 3 at a predetermined lower position.

The limit switch 26 for determining the lower limit serves to set a grass cutting height of the grass cutting unit 3. The grass cutting height is adjustable by varying height of the limit switch 26 which is effected by inserting a pin 31 into a selected one of bores formed in a rod 30 connected to the limit switch 26.

The grass cutting unit 3 is driven by power transmitted through the transmission 6 mounted on the vehicle body 1, a PTO shaft 32 projecting from the transmission 6, and an intermediate transmission shaft 34a having universal joints 33 at opposite ends thereof. The transmission 6 includes a PTO clutch 34 for making and breaking the power transmission to the PTO shaft 32. THe PTO clutch 34 is manually operable by a clutch lever 35 provided in the driver's section. A switch 36 is provided which is turned on and off with operaton of the clutch lever 35 and which is connected to the control device 50.

When the clutch lever 35 is operated to "ON" with the changeover switch 28 set to "AUTO", the switch 36 is turned on. Then the control device 50 causes the electric motor 11 to lower the grass cutting unit 3. When the cluch lever 35 is operated to "OFF", the switch 36 is turned off whereby the electric motor 11 operates in the opposited direction to raise the grass cutting unit 3.

Thus, by setting the changeover switch 28 to "AUTO", the grass cutting unit 3 may be raised or lowered, driven or stopped only by operating the clutch lever 35. When the changeover switch 28 is set to "MANUAL", the grass cutting unit 3 may be raised or lowered regardless of the state of the PTO clutch 34. In this state, the manual switch 27 may be turned to neutral N to render the PTO clutch 34 operable regardless of raising and lowering of the grass cutting unit 3.

Figure 3:
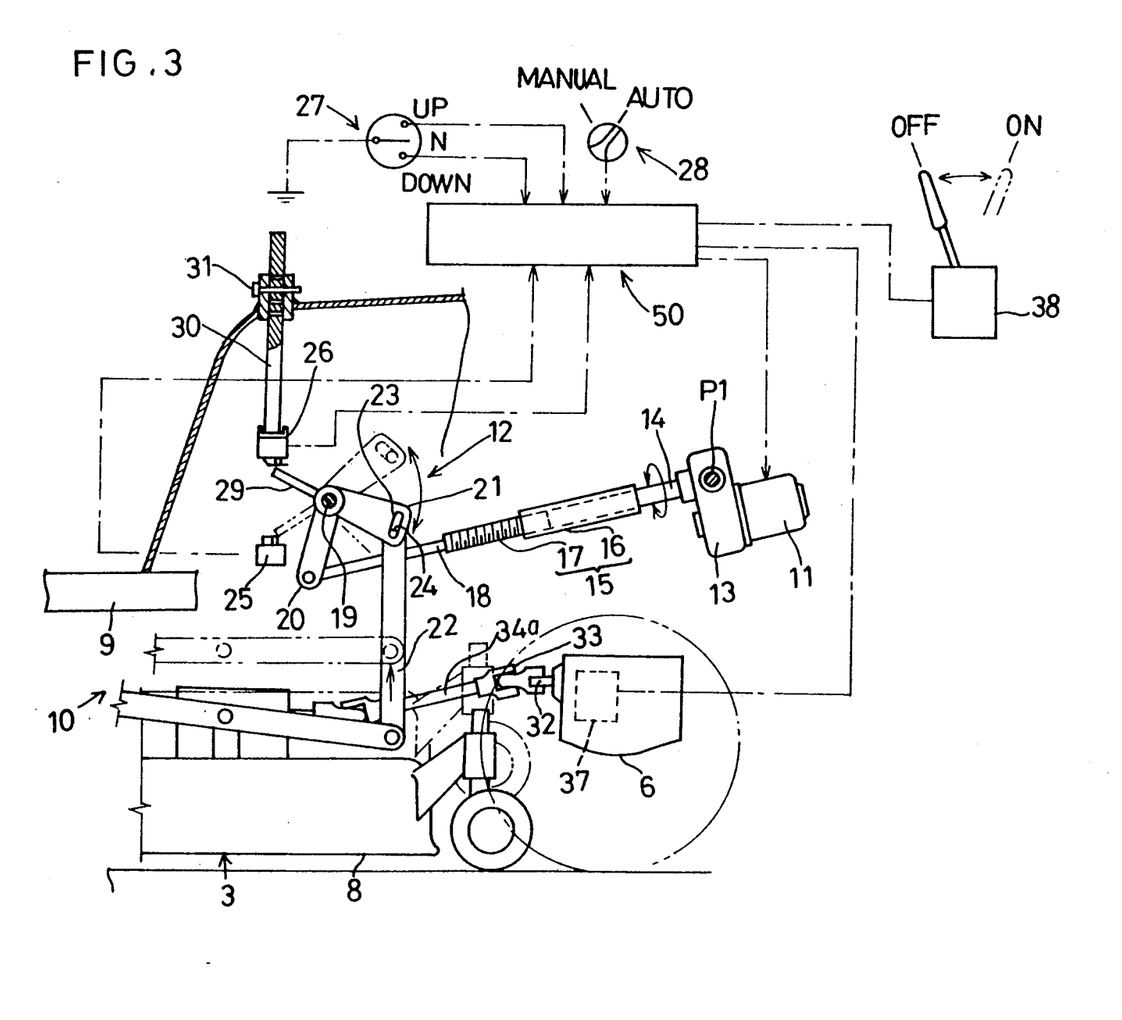
FIG. 3 is an explanatory view of a modified raising and lowering system for the grass cutting unit.

FIG. 3 shows a modification of the foregoing embodiment, which comprised an electromagnetic clutch 37 acting as PTO clutch, and a clutch switch 38 connected to the control device 50 for operating the PTO clutch 37. The control device 11 controls the electric motor 11 to lower the grass cutting unit 3 when the PTO clutch 37 is engaged, and to raise the grass cutting unit 3 when the PTO clutch 37 is disengaged.

A switch may be provided for operating the PTO clutch 37 with movement of a device for raising and lowering the grass cutting unit 3. In this case, the PTO clutch 37 is engaged when the grass cutting unit 3 3 is raised.

Further, possibilities as a device for stopping vertical movement of the grass cutting unit 3 include a mechanism that stops lowering of the grass cutting unit 3 at a fixed position or automatically stops the lowering upon contact of the grass cutting unit 3 with the ground, a mechanism for stopping the grass cutting unit 3 at a position of predetermined height over the ground, and a mechanism for automatically stopping the grass cutting unit 3 having lowered a predetermined distance.

A mechanism for a range of vertical movement, i.e. upper and lower stopping points, of the grass cutting unit 3 will be described next.

Figure 4:
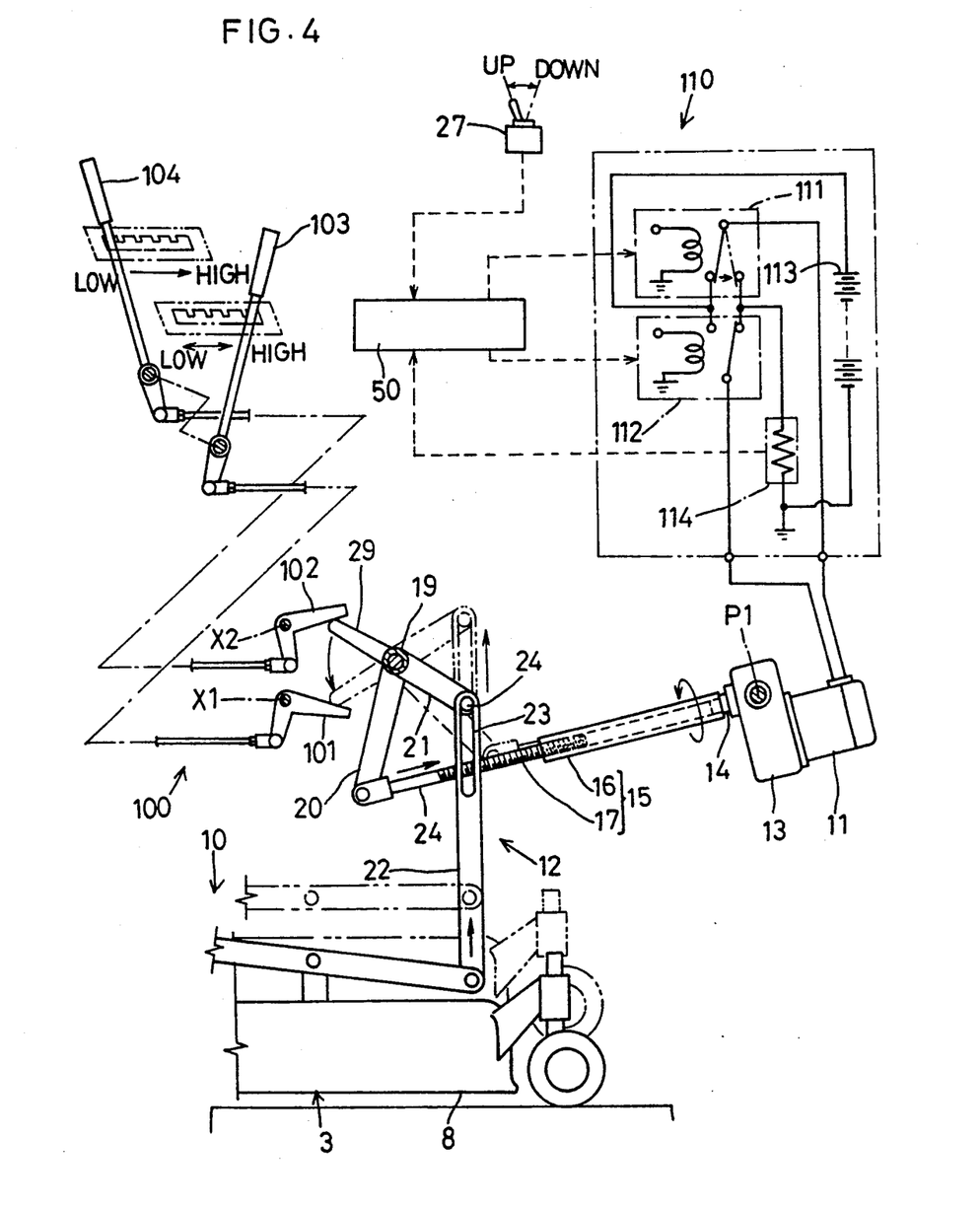
FIG. 4 is an explanatory view of a system for setting a range for raising and lowering the grass cutting unit.

As shown in FIG. 4, the grass cutting unit 3 is raised and lowered through the motor 11, screw feed mechanism 15 and link mechanism 12 as in the foregoing embodiments. As a minor modification made here, the link 22 defines a slot 23 and the swing arm 21 carries a pin 24.

The embodiment shown in FIG. 4 characteristically includes a mechanism 100 for varying heights relative to vehicle body of the upper and lower limits to the vertical movement of the grass cutting unit 3.

Specifically, lower and upper stoppers 101 and 102 are provided for contacting the contact piece 29 attached to the rotary shaft 19, to determine limit positions for the vertical movement of the grass cutting unit 3. The lower and upper stoppers 101 and 102 are pivotable on axes X1 and X2 by rod movement caused by respective adjuster levers 103 and 104 provided in the driver's section. These components constitute the mechanism 100 for varying upper and lower limit positions of the grass cutting unit 3. An automatic stopper mechanism 110 is provided as part of the control device 50 for automatically stopping the motor 11 upon contact of the contact piece 29 with each of the stoppers 101 and 102.

As shown in FIG. 4, an electric circuit including two relays 111 and 112 for raising and lowering, a power source 113 and an ammeter 114 is connected to power supply lines extending to the motor 11. The ammeter 114 and relays 111 and 112 are connected to the control device 50. An up/down switch 27 is also connected to the control device 50 for actuating the motor 11.

This embodiment operates as follows. When, for example, the up/down switch 27 is set to an "UP" position after operating the adjuster levers 103 and 104 to set upper and lower limit positions of the grass cutting unit 3, the control device 50 controls both of the relays 111 and 112 or the relay 111 for raising, to form a closed circuit with the power source 113 and motor 11 for raising the grass cutting unit 3. When the contact piece 29 contacts the stopper 101, the motor 11 is inevitably stopped. This produces a sudden increase in circuit current, which is detected by the ammeter 114 and this information is transmitted to the control device 50. As a result, the relay 111 for raising is switched to cut power supply to the motor 11. When the up/down switch 27 is set to a "DOWN" position thereafter, the relay 112 for lowering is controlled to rotate the motor 11 in the opposite direction to lower the grass cutting unit 3. When the contact piece 29 contacts the stopper 102, the relay 112 for lowering is switched to stop the motor 11.

Thus, the motor 11 is automatically stopped upon detection of a variation in the current flowing to the motor 11. That is, the above mechanism detects an increase in the circuit current and cuts off the circuit current.

Figure 5:
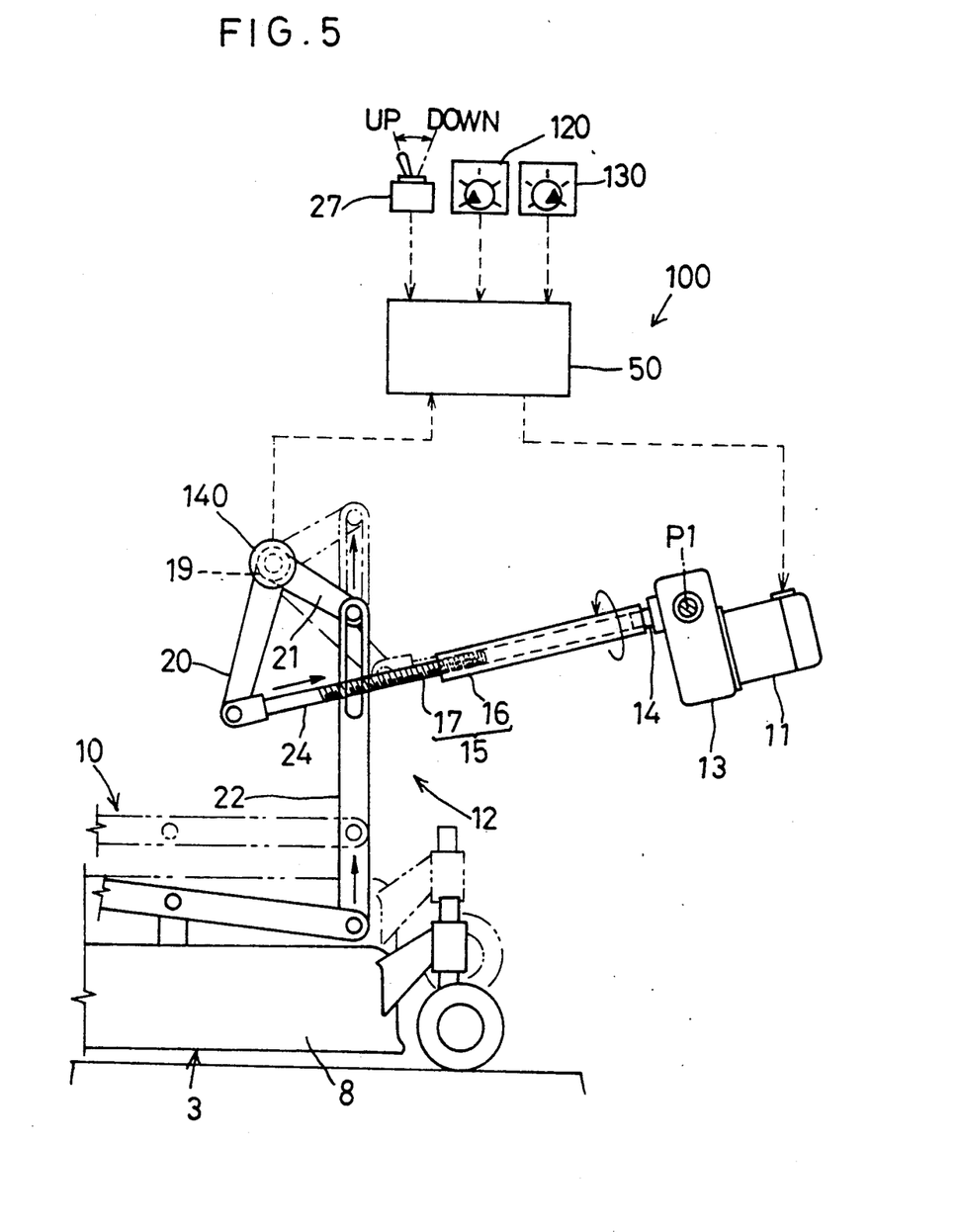
FIG. 5 is an explanatory view showing a modified range setting system.

FIG. 5 shows a modified varying and adjusting mechanism 100. This mechanism 100 includes upper and lower setters 120 and 130 comprising variable resistors, an up/down switch 27, and a potentiometer 140 attached to the rotary shaft 19 for feedback purposes. The switches 27, 120 and 130 and motor 11 are connected to the control device 50.

For lowering the grass cutting unit 3, the lower setter 130 is first operated to set a lower limit position and then the up/down switch 27 is set to a "DOWN" position to drive the motor 11 in a lowering direction. As soon as the potentiometer 140 detects that the grass cutting unit 3 has lowered to the set position, the control device 50 cuts off power supply to the motor 11, thereby stopping the grass cutting unit 3. In this case, the motor 11 is stopped by feedback control based on a comparison between the setter 130 and potentiometer 140.

Within the scope of the present invention, the rotary arm 19 may be controlled by a hydraulic cylinder operable by an electromagnetic control valve connected to the control device 50. In this case, raising and lowering of the grass cutting unit 3 are automatically stopped by operation of the electromagnetic valve based on the detection made by the potentiometer 140.

Figure 6:
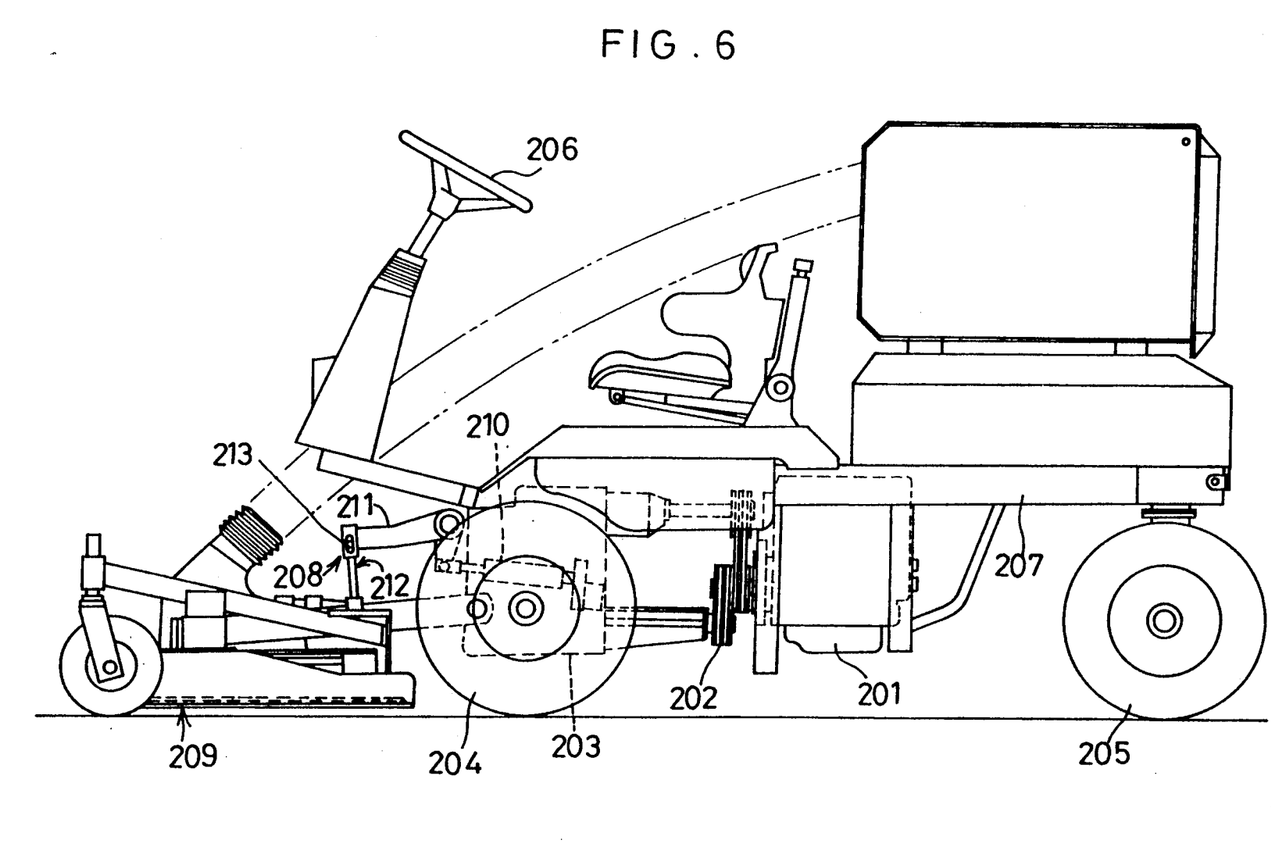
FIG. 6 is a side elevation of a different lawn mower with raising and lowering control for a grass cutting unit according to the present invention.

Next, a lawn mower as shown in FIG. 6 will be described, which is one example of working vehicles having an inclination detecting device and raising or lowering a grass cutting unit in response to an inclination of a vehicle body. The illustrated lawn mower is a front mount type riding lawn mower having a grass cutting unit 209 disposed forwardly of the vehicle body. Right and left front wheels 204 through a belt transmission device 202 and a transmission 203. Right and left wh eels 205 are steerable by a steering handle 206. The grass cutting unit 209 is connected to the front of t he vehicle body 207 through a lift link 208.

The lift link 208 is vertically adjustably connected through a lift rod 212 to a lift arm 211 vertically movable by an electric cylinder 210 acting as a forcible drive means. The lift rod 212 defines a slot 213 in an upper end region thereof for allowing the grass cutting unit 209 to follow the ground. The electric cylinder 210 is extendible and contractible, with a screw shaft mounted in a tube to be driven in opposite directions by a DC motor.

Figure 7:
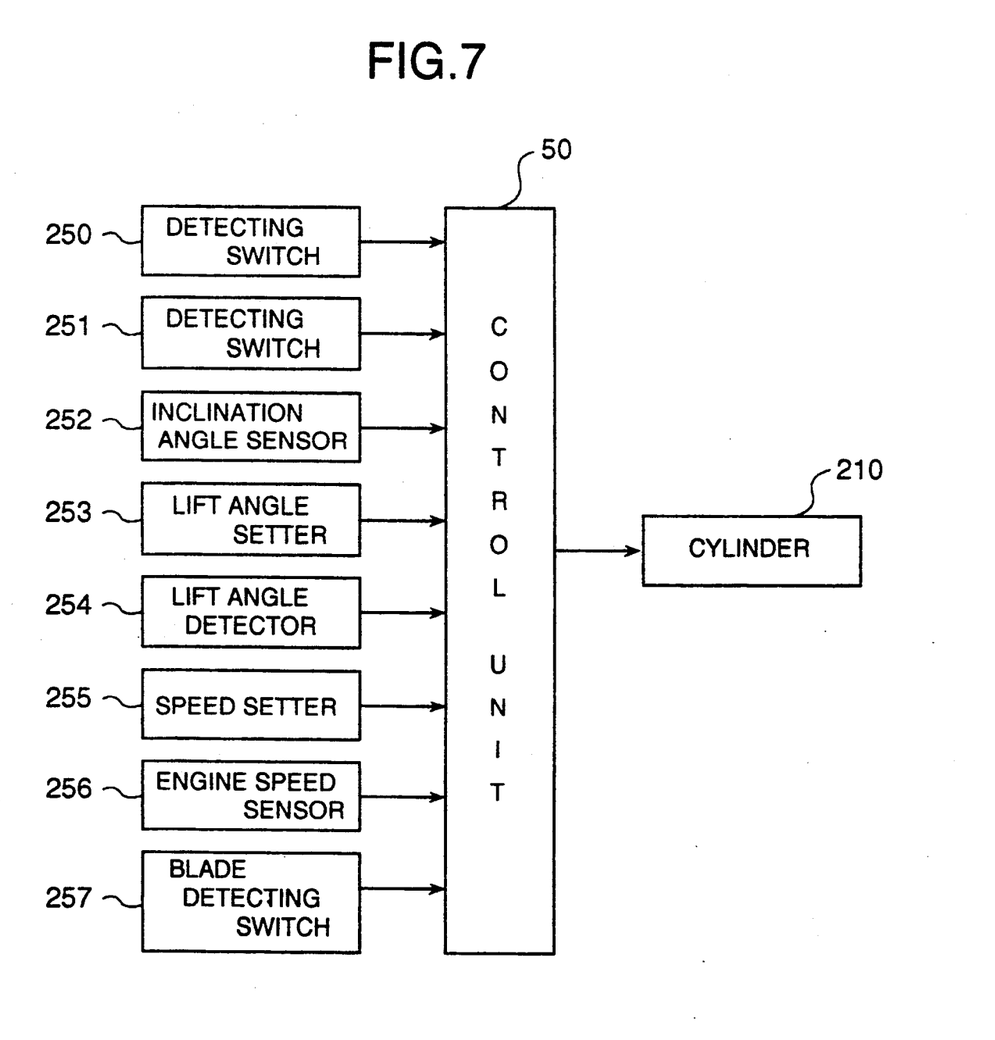
FIG. 7 is a block diagram of a raising and lowering system for the grass cutting unit shown in FIG. 6.

The vehicle body 207 includes, arranged at appropriate positions thereof, a switch 250 for detecting ON/OFF states of an engine key switch, a switch 251 for detecting ON/OFF states of a running brake, and an inclination angle sensor 252 for detecting a forward inclination of the vehicle. As shown in FIG. 7, these sensors 250, 251 and 252, a lift arm angle setter 253, and a potentiometer 254 acting as a lift angle detector for detecting a lift arm angle are connected to a control device 50 comprising a microcomputer.

The electric cylinder 210 also is connected to the control device 50 to be operable by advice signal received from the control device 50. The control device 50 causes the grass cutting unit 209 to be lowered to a lowermost position when the vehicle is stopped and the engine is stopped, or when the running brake is operated on a flat terrain. In other cases, only when the inclination angle sensor 252 detects an inclination of the vehicle body exceeding a predetermined angle, the grass cutting unit 209 is forcibly lowered at least to a predetermined position corresponding to the inclination angle. Once the vehicle body is reinstated in a horizontal posture within the predetermined inclination angle, the grass cutting unit 209 is returned to an original height position set through the lift arm angle setter 253.

The vehicle body 207 further includes a switch 257 for detecting turning and stoppage of cutting blades of the grass cutting unit 209, and a speed sensor 256 for detecting rotational rate of the engine. These sensors 257 and 256 and an engine speed setter 255 are connected to the control device 50. When the rotational rate of the engine is reduced below a set rotational rate by an overload acting on the grass cutting unit 209, the grass cutting unit 209 may be raised to a height corresponding to the reduction in the rotational rate of the engine, i.e. to a position to eliminate the overload acting on the grass cutting unit 209.

What is claimed is:

1. A working vehicle having a grass cutting unit vertically movable relative to a vehicle body, comprising;

a power source, blade means included in said grass cutting unit, transmission means for transmitting power from said power source to said blade means, lift means for raising and lowering said grass cutting unit, switch means for making and breaking power transmission through said transmission means to said blade means, and control means for controlling said lift means to lower said grass cutting unit when power is transmitted to said blade means by the switch means, and to raise said grass cutting unit when the power transmission to said blade means is broken by said switch means.

2. A working vehicle as claimed in claim 1, wherein said lift means includes a link mechanism for vertically movably suspending said grass cutting unit under said vehicle body, a reversible electric motor controllable by said control means, and a raising and lowering drive mechanism for converting a rotary motion of said electric motor to a vertical linear motion.

3. A working vehicle as claimed in claim 1, further comprising first position detecting means for detecting an upper limit position of said grass cutting unit, and second position detecting means for detecting a lower limit position of said grass cutting unit, said first and second position detecting means transmitting signals to said control means.

4. A working vehicle as claimed in claim 3, wherein said first and second position detecting means comprise potentiometers.

5. A working vehicle as claimed in claim 1, further comprising a first position stopper for determining a raising limit of said grass cutting unit, and a second position stopper for determining a lowering limit of said grass cutting unit, said first and second stoppers being operable to vary stop positions thereof.

6. A working vehicle as claimed in claim 1, further comprising inclination detecting means for detecting inclination of said vehicle body, said control means being operable to control said lift means to forcibly lower said grass cutting unit when said inclination detecting means detects an inclination exceeding a predetermined value.

7. A working vehicle having a grass cutting unit vertically movable relative to a vehicle body, comprising;

a power source, blade means included in said grass cutting unit, transmission means for transmitting power from said power source to said blade means, lift means for raising and lowering said grass cutting unit, switch means for making and breaking power transmission through said transmission means to said blade means, and control means for controlling said switch means to transmit power to said blade means when said grass cutting unit is lowered by said lift means, and to break the power transmission to said blade means when said grass cutting unit is raised by said lift means.

8. A working vehicle having a grass cutting unit vertically movable relative to a vehicle body, comprising;

a power source, blade means included in said grass cutting unit, transmission means for transmitting power from said power source to said blade means, lift means for raising and lowering said grass cutting unit, switch means for making and breaking power transmission through said transmission means to said blade means, and control means for controlling said lift means to lower said grass cutting unit when power is trammsitted to said blade means by the switch means, and to raise said grass cutting unit when the power transmission to said blade means is broken by said switch means.

said control means further controlling said switch means to transmit power to said blade means when said grass cutting unit is lowered by said lift means, and to break the power transmission to said blade means when said grass cutting unit is raised by said lift means.

* * * * *